United States Patent
Song (10) Patent No.: US 11,767,061 B2
(45) Date of Patent: Sep. 26, 2023

(54) SIDE SILL ASSEMBLY OF VEHICLE WITH REINFORCED STIFFNESS

(71) Applicants: Hyundai Motor Company, Seoul (KR); Kia Corporation, Seoul (KR)

(72) Inventor: Won-Jung Song, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 17/569,491

(22) Filed: Jan. 5, 2022

(65) Prior Publication Data
US 2023/0071635 A1    Mar. 9, 2023

(30) Foreign Application Priority Data

Sep. 9, 2021  (KR) .......................... 10-2021-0120466

(51) Int. Cl.
| | |
|---|---|
| *B62D 25/02* | (2006.01) |
| *B62D 25/20* | (2006.01) |
| *B62D 27/02* | (2006.01) |
| *B60K 1/04* | (2019.01) |
| *B62D 21/15* | (2006.01) |

(52) U.S. Cl.
CPC .............. *B62D 25/025* (2013.01); *B60K 1/04* (2013.01); *B62D 27/02* (2013.01); *B62D 27/023* (2013.01); *B60K 2001/0438* (2013.01); *B62D 21/157* (2013.01)

(58) Field of Classification Search
CPC ... B62D 25/025; B62D 21/157; B62D 27/023
USPC ................................. 296/209, 187.12, 29, 30
See application file for complete search history.

(56) References Cited

U.S. PATENT DOCUMENTS

| | | | | |
|---|---|---|---|---|
| 3,534,463 | A * | 10/1970 | Molin .................... | B21D 47/00 52/394 |
| 9,493,190 | B1 * | 11/2016 | Alwan .................. | B62D 25/025 |
| 9,725,118 | B2 * | 8/2017 | Alwan .................... | B60K 1/04 |
| 10,293,862 | B1 * | 5/2019 | Patel ...................... | B62D 21/15 |
| 10,370,040 | B1 * | 8/2019 | Cooper ................ | B62D 21/157 |
| 11,535,298 | B2 * | 12/2022 | Son ....................... | B62D 25/025 |

FOREIGN PATENT DOCUMENTS

| | | | |
|---|---|---|---|
| DE | 102018207221 A1 | * | 11/2019 |
| KR | 20-1997-0051616 | | 9/1997 |

* cited by examiner

*Primary Examiner* — Dennis H Pedder
(74) *Attorney, Agent, or Firm* — MORGAN, LEWIS & BOCKIUS LLP (57) ABSTRACT

A side sill assembly of the vehicle includes a side sill inner, a side sill outer, and a reinforcement unit provided between the side sill inner and the side sill outer, wherein the reinforcement unit may include a plurality of cell members having an upper member and a lower member bonded to each other vertically at intervals therebetween, and disposed in a longitudinal direction of the vehicle at intervals from each other therebetween; and a connector bonded to rear and front end portions of different cell members among the plurality of cell members to connect the plurality of cell members to each other in the longitudinal direction of the vehicle.

17 Claims, 6 Drawing Sheets

SIDE SILL ASSEMBLY OF VEHICLE WITH REINFORCED STIFFNESS

CROSS-REFERENCE TO RELATED APPLICATION

The present application claims priority to Korean Patent Application No. 10-2021-0120466, filed on Sep. 9, 2021, the entire contents of which is incorporated herein for all purposes by this reference.

BACKGROUND OF THE INVENTION

Field of the Invention

The present invention relates to a side sill assembly configured to support a lower portion of a side surface of a vehicle, and more specifically, to a side sill assembly of a vehicle with reinforced stiffness, which may protect a high-voltage battery mounted therein from impact in the event of a side collision while achieving lightweight.

Description of Related Art

A side sill is provided to exert the stiffness of a lower portion of a side surface of the vehicle.

Meanwhile, an eco-friendly vehicle, such as an electric vehicle or a hybrid electric vehicle, utilizes a lower portion of a center floor panel of a vehicle as a mounting space of a high-voltage battery that supplies power to a driving motor.

The eco-friendly vehicle does not share a platform with an internal combustion engine vehicle, and adopts a platform for only electric vehicle. This is because it is advantageous that a space under the center floor panel is utilized to increase the capacity of the mounted high-voltage battery to increase the mileage of the vehicle.

However, such a structure is exposed to the risk of damage to the high-voltage battery in the event of a side collision of the vehicle. The damage to the high-voltage battery leads to a fire, and fire due to damage to the high-voltage battery is difficult to extinguish unlike a general fire.

Therefore, the side sill may exert sufficient stiffness so that collision energy is not delivered to the high-voltage battery in the event of the side collision.

To the present end, a reinforcing structure is applied to the inside of the side sill including a side sill inner and a side sill outer.

For example, there is a side sill reinforcement structure which is applied to the inside of the side sill by manufacturing a reinforcement member by extruding an aluminum material. Although the aluminum extruded material may be lightweight, the manufacturing cost is high, weakening price competitiveness.

Figure 1:
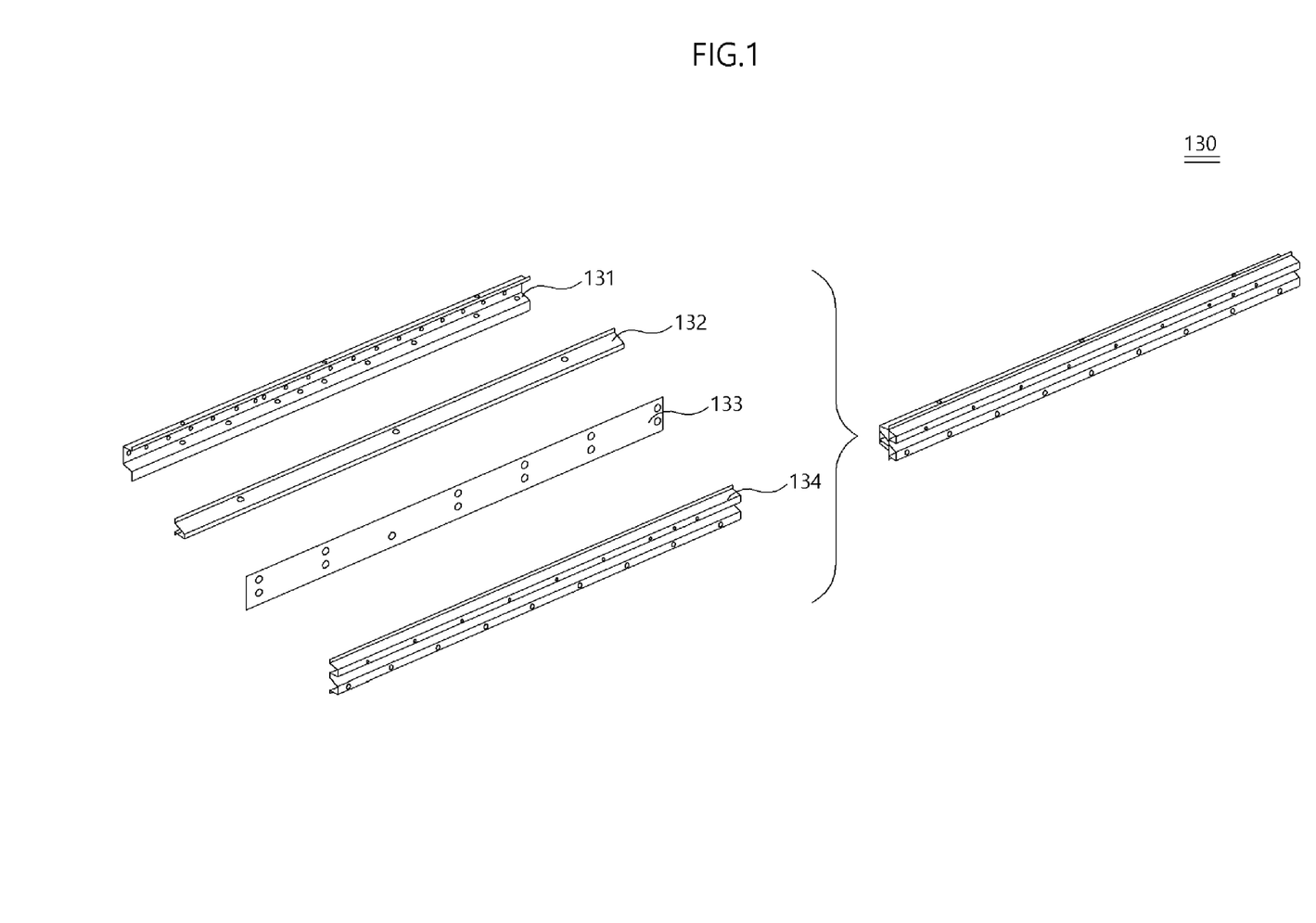
FIG. 1 is an exploded perspective diagram and a perspective diagram showing a side sill reinforcement member of a steel press structure according to the related art.
Figure 2:
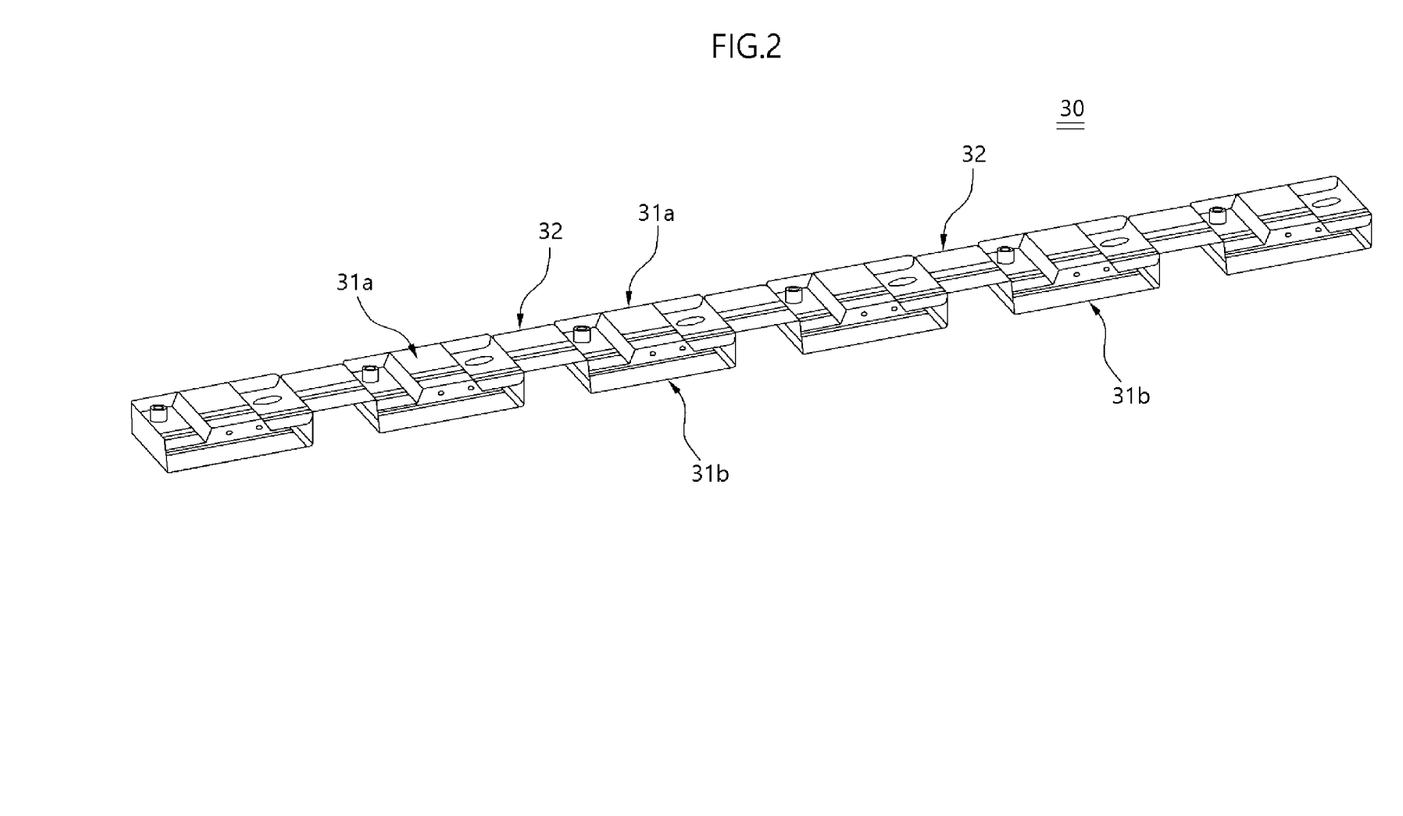
FIG. 2 is an exploded perspective diagram and a perspective diagram showing a reinforcement unit of a side sill assembly of a vehicle with reinforced stiffness according to various exemplary embodiments of the present invention.
Figure 3:
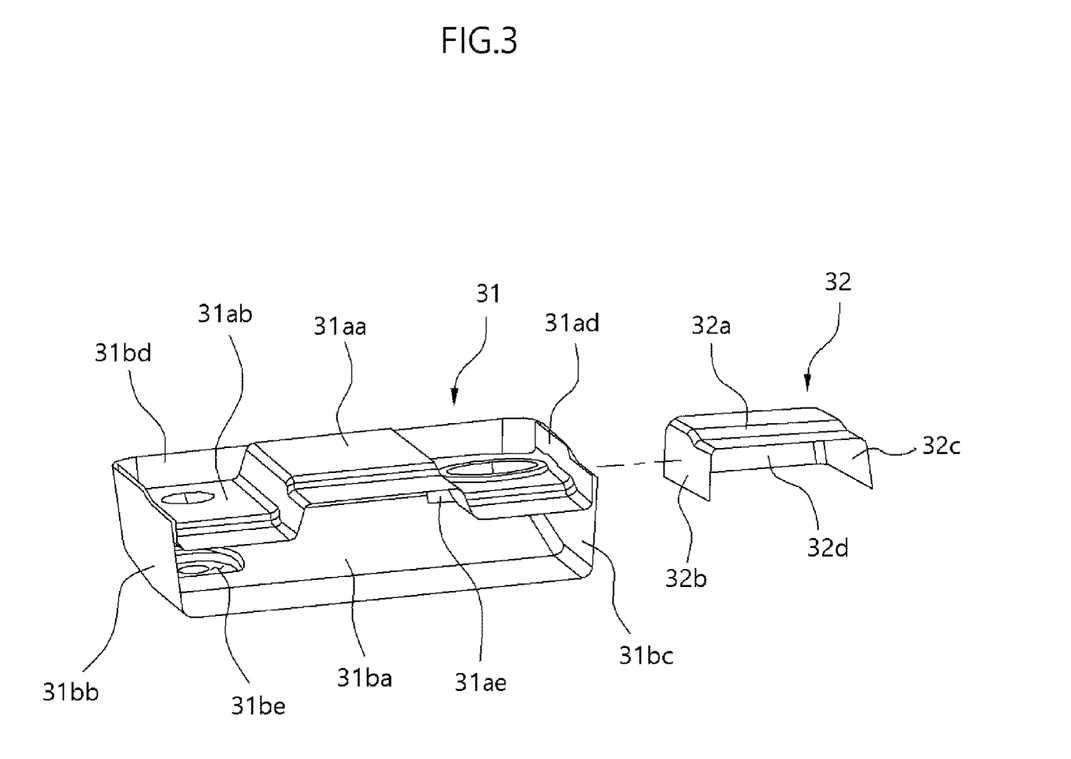
FIG. 3 is an exploded perspective diagram showing a connection relationship between a cell member and a connector in the reinforcement unit of the side sill assembly of the vehicle with reinforced stiffness according to various exemplary embodiments of the present invention.

Meanwhile, as shown in FIG. 1, a reinforcement unit 130 of a steel press structure including reinforcement members 131 to 134 made of a steel material may further be manufactured and applied to the inside of the side sill. However, this may lower the cost, but there is a problem in that the weight is increased compared to the aluminum extruded material.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a side sill assembly of a vehicle with reinforced stiffness, which utilizes an inexpensive material but exerts sufficient stiffness performance even while suppressing the weight to a level of an aluminum material, reducing deformation due to impact in the event of a side collision.

According to a side sill assembly of a vehicle with reinforced stiffness according to various exemplary embodiments of the present invention for achieving the object, in the side sill assembly of the vehicle including: a side sill inner, a side sill outer, and a reinforcement unit provided between the side sill inner and the side sill outer, the reinforcement unit may include a plurality of cell members having an upper member and a lower member bonded to each other vertically at intervals therebetween, and disposed in a longitudinal direction of the vehicle at intervals from each other therebetween; and a connector bonded to rear and front end portions of different cell members among the plurality of cell members to connect the plurality of cell members to each other in the longitudinal direction of the vehicle.

The cell member may be formed so that a width of the plurality of cell members in the longitudinal direction of the vehicle may be increased from a lower end portion toward an upper end portion thereof, and the connector may be formed so that the width of the connector members in the longitudinal direction of the vehicle may be increased from an upper end portion toward a lower end portion thereof.

The cell member may include an upper member having at least a stage in the longitudinal direction of the vehicle; and a lower member accommodating the upper member therein and bonded to front and rear end portions of the upper member.

A lower surface of the upper member may be provided to be spaced from a bottom portion of the lower member at a predetermined interval.

The upper member may include the lower surface; and an upper surface located higher than the lower surface, and disposed in the longitudinal direction of the vehicle together with the lower surface.

The front and rear end portions of the upper member may be formed with a first front flange portion and a first rear flange portion extending in a height direction of the vehicle to contact with an inside surface of the lower member, respectively.

The lower member may include the bottom portion bonded to an inclined surface of an inside surface of the side sill inner; a second front flange portion extending upwards from a front end portion of the bottom portion; a second rear flange portion extending upwards from a rear end portion of the bottom portion; and a first side flange portion extending upwards from a width direction of the vehicle from the bottom portion and formed on the upper member and a second side flange portion bonded to a surface perpendicular to the inside surface of the side sill inner.

The width direction of the vehicle from the upper surface and the lower surface of the upper member may be formed with the first side flange portion the contacting with the second side flange portion of the lower member.

The upper surface of the upper member may be located at a same height as a height of an upper end portion of the lower member.

The connector may include an upper surface portion; a third front flange portion extending downwardly from a front end portion of the upper surface portion and bonded to a rear end portion of the cell member located on front thereof; and a third rear flange portion extending downwardly from a rear end portion of the upper surface portion and bonded to a front end portion of the cell member located on rear thereof.

The connector may further include a third side flange portion extending downwardly from a width direction of the vehicle from the upper surface portion of the connector and bonded to an upright surface of the side sill inner.

The front and rear of the upper surface may be formed with welding holes formed in the lower surface, and having a welding tool that bonds the cell member to the inside surface of the side sill inner penetrating on any one of the lower surface, respectively.

A lower end portion of a battery mounting nut configured to mount a battery may be bonded to the bottom portion of the lower member, and a through hole through which the battery mounting nut is provided to penetrate may be formed in any one of the lower surface of the upper member.

The battery mounting nut may be bonded to the lower surface of the upper member by $CO_2$ welding or projection welding.

An outside circumference of the battery mounting nut may be bonded to an inside circumference of the through hole by $CO_2$ welding.

The cell member and the connector may be bonded to each other by spot welding.

The cell member and the connector may be bonded to the side sill inner by spot welding.

According to the side sill assembly of the vehicle with reinforced stiffness according to various exemplary embodiments of the present invention having the above configuration, it is possible to use the inexpensive material such as steel but exert stiffness corresponding thereto with the weight of the level equivalent to the expense aluminum extruded material, implementing the side collision performance and saving the cost.

As described above, it is possible to improve performance against the side collision in the vehicle to which the high-voltage battery is applied, preventing fire caused by damage to the high-voltage battery due to the side collision.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a side sill assembly of a vehicle with reinforced stiffness according to various exemplary embodiments of the present invention will be described in detail with reference to the accompanying drawings.

According to a side sill assembly of a vehicle with reinforced stiffness according to various exemplary embodiments of the present invention, in the side sill assembly of the vehicle with reinforced stiffness including a side sill inner 10, a side sill outer 20, and a reinforcement unit 30 provided between the side sill inner 10 and the side sill outer 20, the reinforcement unit 30 may include a plurality of cell members 31 having an upper member 31*a* and a lower member 31*b* bonded to each other at intervals vertically from each other and disposed at intervals from each other in a longitudinal direction of the vehicle, and a connector 32 bonded to rear and front end portions of different cell members 31 to connect the cell members 31 to each other in the longitudinal direction of the vehicle.

The side sill assembly 1 may have the side sill inner 10 and the side sill outer 20 disposed on a lower portion of a side surface of the vehicle in the longitudinal direction of the vehicle bonded to each other, and may have the side sill reinforcement unit 30 configured to reinforce the stiffness of the side sill assembly 1 (hereinafter referred to as 'reinforcement unit') provided between the side sill inner 10 and the side sill outer 20.

The side sill inner 10 and the side sill outer 20 may have upper bonding portions 11, 21 and lower bonding portions 12, 22 for bonding formed on upper and lower portions thereof, respectively, and intermediate portions formed to be convex in opposite directions to have a space formed therein.

The reinforcement unit 30 may be provided in the space formed between the side sill inner 10 and the side sill outer 20, so that the stiffness of the side sill assembly 1 may be reinforced.

To the present end, the reinforcement unit 30 may include the plurality of cell members 31 having the upper member 31a and the lower member 31b bonded to each other at intervals vertically, and disposed in the longitudinal direction of the vehicle at intervals from each other, and the connector 32 connecting the cell members 31 to each other.

The cell member 31 and the connector 32 may be alternately disposed in the longitudinal direction of the vehicle, and the cell member 31 and the connector 32 may be bonded by spot welding, becoming the reinforcement unit 30. As the cell member 31 and the connector 32 may be alternately disposed, any one connector 32 may have a front end portion bonded to a rear end portion of the cell member 31 located at the front, and a rear end portion bonded to a front end portion of another cell member 31 located at the rear.

The cell member 31 and the reinforcement unit 30 may be formed so that a width in the longitudinal direction of the vehicle may be increased in a height direction of the vehicle. For example, the cell member 31 may be formed so that the width in the longitudinal direction of the vehicle may be increased from a lower end portion toward an upper end portion thereof, and the connector 32 may be formed so that the width in the longitudinal direction of the vehicle is increased from the upper end portion toward the lower end portion thereof.

The cell member 31 may include the upper member 31a formed in a multi-stage shape in the longitudinal direction of the vehicle, and the lower member 31b accommodating the upper member 31a and bonded to the front and rear end portions of the upper member 31a. In other words, the lower member 31b may have a cross section with an opened upper portion, and the circumference of the upper member 31a may be bonded to an inside surface of the lower member 31b, with the upper member 31a accommodated in the lower member 31b.

Figure 4:
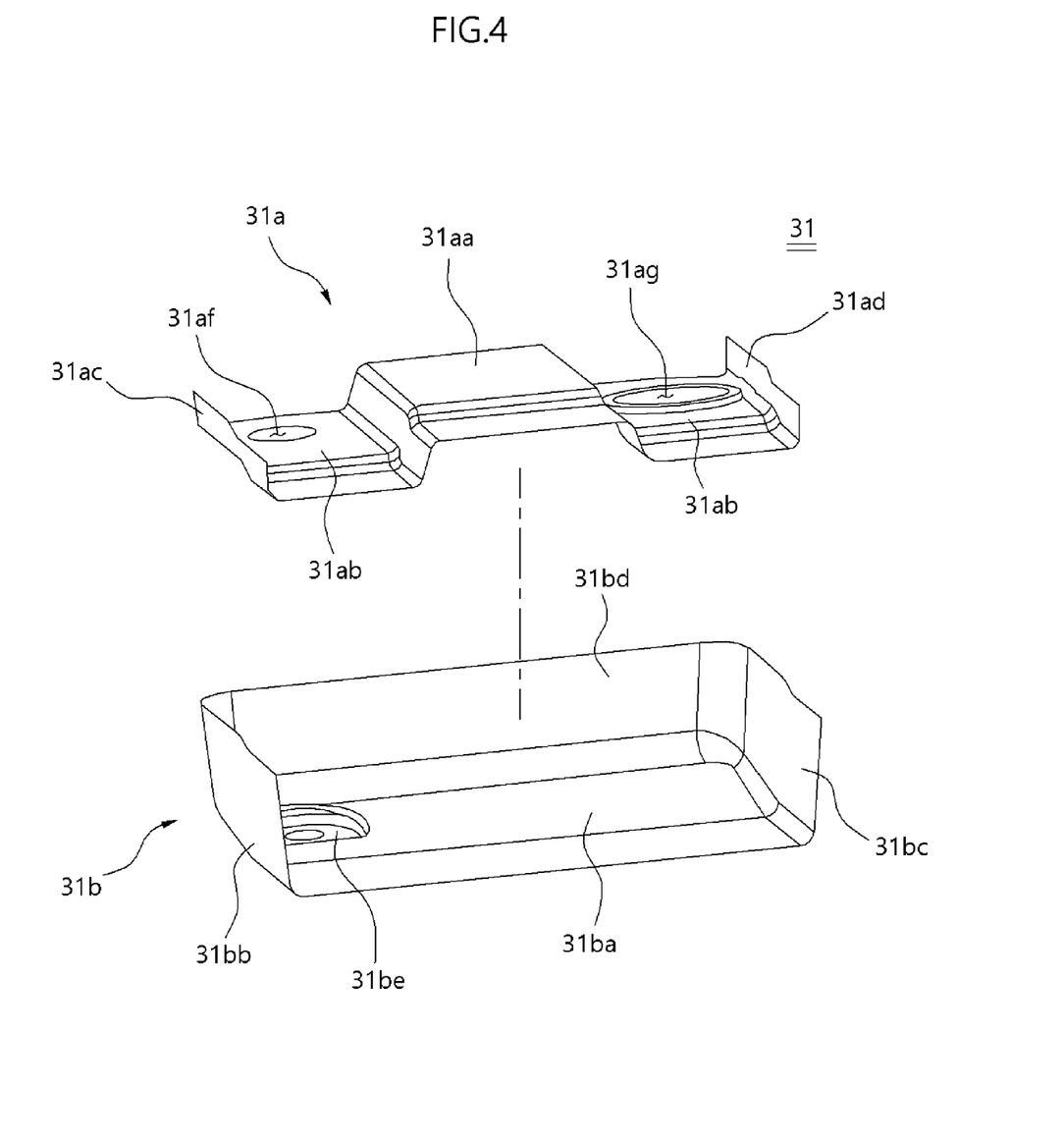
FIG. 4 is an exploded perspective diagram showing the connection relationship between an upper member and a lower member forming the cell member in the reinforcement unit of the side sill assembly of the vehicle with reinforced stiffness according to various exemplary embodiments of the present invention.

The upper member 31a may have a lower surface 31ab and an upper surface 31aa located higher than the lower surface 31ab disposed in the longitudinal direction of the vehicle. A plurality of upper surfaces 31aa and a plurality of lower surfaces 31ab may be alternately disposed in the longitudinal direction of the vehicle. For example, as shown in FIG. 4, the upper member 31a may have a form in which the lower surface 31ab may be disposed on the front and rear of the upper surface 31aa, respectively.

Here, the lower surface 31ab may be formed at an interval from a bottom portion 31ba of the lower member 31b, and the upper member 31a may have a multi-stage structure, improving the stiffness against a side collision.

To be bonded to the lower member 31b, the upper member 31a may have a first front flange portion 31ac and a first rear flange portion 31ad extending in the height direction of the vehicle and contacting with the inside surface of the lower member 31b formed on the front and rear end portions of the upper member 31a. Furthermore, a first side flange portion 31ae may be also formed on a width directional inside end portion of the vehicle of the upper member 31a to contact with the inside surface of the lower member 31b.

The lower member 31b may include the bottom portion 31ba bonded to an inclined surface of the inside surface of the side sill inner 10, a second front flange portion 31bb extending upwards from the front end portion of the bottom portion 31ba, a second rear flange portion 31bc extending upwards from the rear end portion of the bottom portion 31ba, wherein the first side flange portion 31ae extends upwards from the width direction of the vehicle from the bottom portion 31ba and formed on the upper member 31a, and a second side flange portion 31bd bonded to a surface perpendicular to the inside surface of the side sill inner 10.

Figure 5:
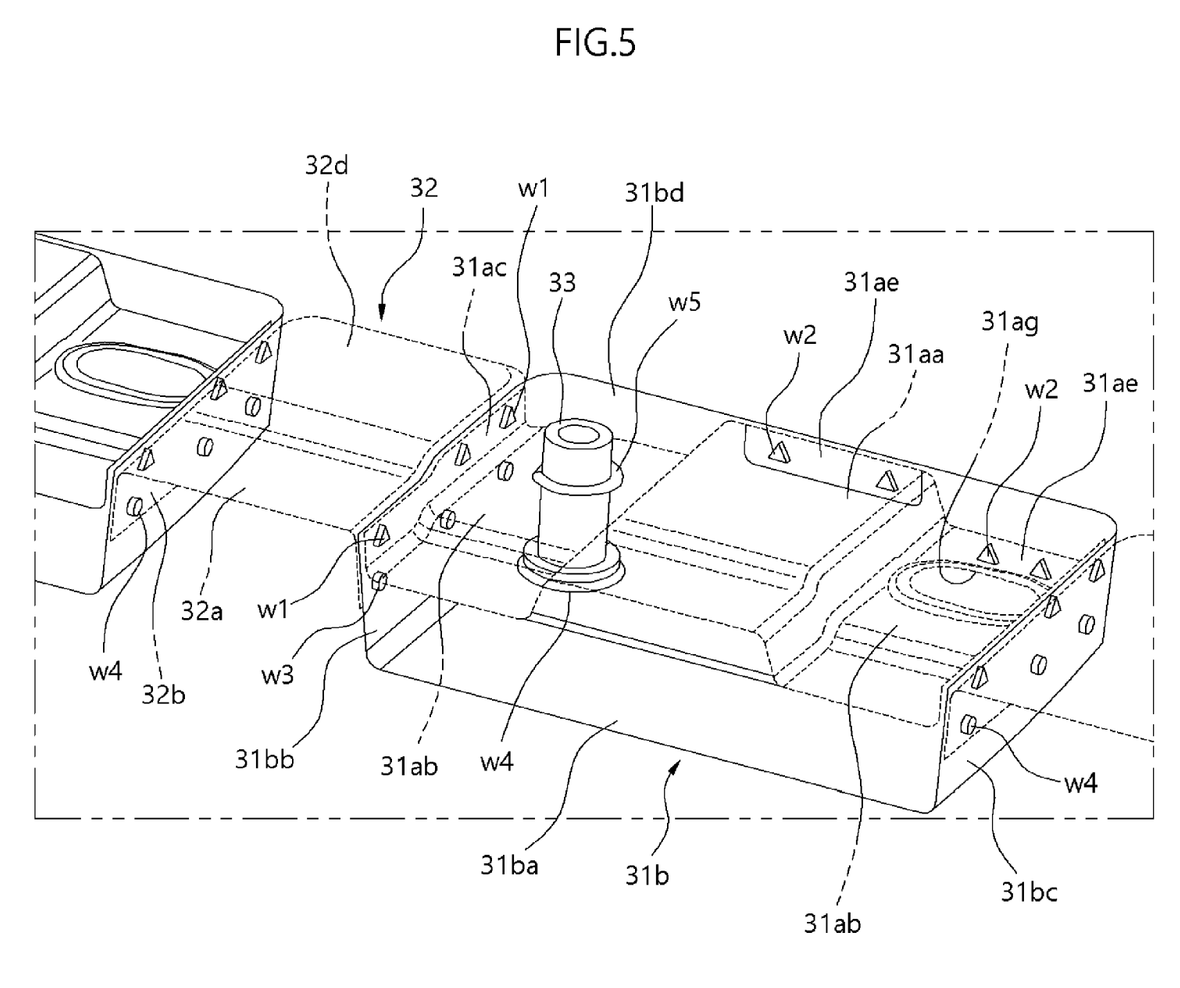
FIG. 5 is an enlarged perspective diagram of main portions of the reinforcement unit of the side sill assembly of the vehicle with reinforced stiffness according to various exemplary embodiments of the present invention.

The bottom portion 31ba may form a lower portion of the lower member 31b, and a portion thereof may be bonded to the inclined surface of the inside surface of the side sill inner 10 horizontally (portion indicated by 'w7' in FIG. 5). The upper member 31a may be provided in the lower member 31b so that the lower surface 31ab of the upper member 31a may be spaced from the bottom portion 31ba at a predetermined interval.

The second front flange portion 31bb and the second rear flange portion 31bc may be formed by extending upwards from the front and rear end portions of the bottom portion 31ba, respectively. The second front flange portion 31bb and the second rear flange portion 31bc may have the inside surfaces bonded to the first front flange portion 31ac and the first rear flange portion 31ad, respectively, by welding (portion indicated by 'w1' in FIG. 5).

Furthermore, the second side flange portion 31bd formed to extend upwards from the width directional inside end portion of the vehicle of the bottom portion 31ba may be formed. The second side flange portion 31bd may have the inside surface bonded to the first side flange portion 31ae, and outside surface bonded to the surface perpendicular to the inside surface of the side sill inner 10 by spot welding (portion indicated by 'w2' in FIG. 5).

The lower member 31b may have a form in which the upper surface and surfaces other than the width directional outside surface of the vehicle may be connected to each other.

The upper surface of the upper member 31a and the upper end portion of the lower member 31b may be located at the same height.

The upper member 31a and the lower member 31b in the cell member 31 may be bonded to each other by spot welding.

It is possible to exert the stiffness against the side collision by the cross-sectional structure formed of the cell member 31 by bonding the upper member 31a and the lower member 31b.

Meanwhile, each of the front and rear of the upper surface 31aa may be formed with the welding hole 31ag, which may be formed in the lower surface 31ab and may have a welding tool that bonds the cell member 31 to the inclined surface of the inside surface of the side sill inner 10 penetrating on any one of the lower surface 31ab. In a state where the upper member 31a and the lower member 31b may be bonded, it is difficult to introduce the welding tool for bonding the lower member 31b to the side sill inner 10 into a space between the upper member 31a and the lower member 31b. Therefore, the welding hole 31ag may be formed in the lower surface 31ab and the welding tool may be introduced into the welding hole 31ag so that the lower member 31b may be bonded to the side sill inner 10.

Furthermore, the lower surface 31ab of the upper member 31a may be formed with a through hole 31af through which the battery mounting nut 33 is provided to penetrate and the welding hole 31ag configured to bond the lower member 31b to the inside surface of the side sill inner 10.

A nut mounting surface 31be may be formed on the bottom portion 31ba of the lower member 31b so that the lower end portion of the battery mounting nut 33 configured to mount the high-voltage battery 40 to the nut mounting surface 31be may be bonded (portion indicated by 'w4' in FIG. 5). Furthermore, any one of the lower surface 31ab of the upper member 31a may be formed with the through hole 31af through which the battery mounting nut 33 is provided to penetrate. At the instant time, the battery mounting nut 33 may be bonded to the lower surface 31ab by $CO_2$ welding or projection welding, and an outside circumference of the battery mounting nut 33 may be bonded to an inside circumference of the through hole 31af by $CO_2$ welding (portion indicated by 'w5' in FIG. 5). Therefore, a structure configured for mounting the high-voltage battery 40 to the reinforcement unit 30 may be formed.

Here, the through hole 31af and the welding hole 31ag may be formed by changing their locations. In other words, FIG. 4 shows the through hole 31af is formed on the left and the welding hole 31ag is formed on the right, and on the contrary, the through hole 31af may further be formed on the right and the welding hole 31ag may further be formed on the left.

The connector 32 may include an upper surface portion 32a, a third front flange portion 32b extending downwardly from the front end portion of the upper surface portion 32a and bonded to the rear end portion of the cell member 31 located on the front thereof, and a third rear flange portion 32c extending downwardly from the rear end portion of the upper surface portion 32a and bonded to the front end portion of the cell member 31 located on the rear thereof.

The connector 32 may use the upper surface portion 32a as a base and the third front flange portion 32b and the third rear flange portion 32c may be bonded to the rear end portion or the front end portion of the cell member 31 adjacent thereto by welding (portion indicated by 'w3' in FIG. 5), so that the cell member 31 and the connector 32 may be connected in the longitudinal direction of the vehicle.

Furthermore, the connector 32 may further include a third side flange portion 32d extending downwardly from the width direction of the vehicle from the upper surface portion 32a and bonded to the surface perpendicular to the inside surface of the side sill inner 10. By bonding the connector 32 to the side sill inner 10 through the third side flange portion 32d by spot welding (portion indicated by 'w6' in FIG. 6A and FIG. 6B), the reinforcement unit 30 may be securely bonded to the side sill inner 10.

According to the side sill assembly of the vehicle with reinforced stiffness according to various exemplary embodiments of the present invention having the above configuration, the reinforcement unit 30 reinforces the stiffness of the side sill assembly 1 against the laterally input load, enhancing stability against the side collision.

Figure 6A:
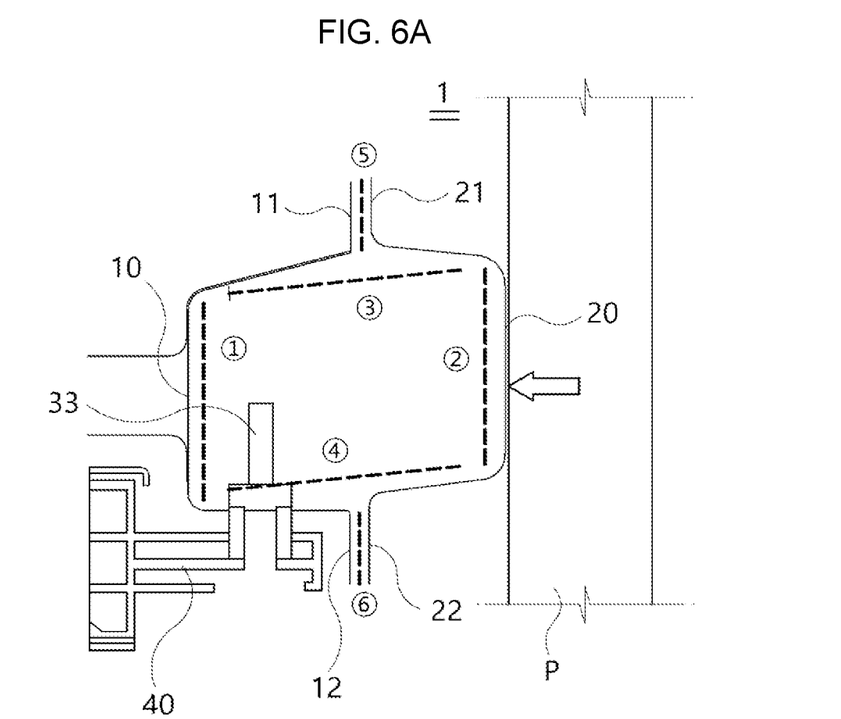
FIG. 6A is a schematic diagram and FIG. 6B is a perspective diagram showing a state where the reinforcement unit is coupled to a side sill and a high-voltage battery according to the side sill assembly of the vehicle with reinforced stiffness according to various exemplary embodiments of the present invention.

The side sill assembly 1 including the side sill inner 10 and the side sill outer 20 may have surfaces indicated by ① to ⑥ of FIG. 6A. In other words, in the event of the side collision, the side sill assembly 1 may have surfaces (①, ②) directly forming sidewalls, surfaces (③, ④) connecting the sidewalls, and surfaces (⑤, ⑥) assembling the inside and outside of the side sill with parts. Here, as in a case where the side surface of the vehicle and a utility pole (P) collide, to improve the side collision performance, it is good to directly connect the surfaces (①, ②), and if impossible, the surfaces (③, ④) may be connected. However, the conventional aluminum extruded structure and steel press welding structure have the structure of connecting only the surfaces (⑤, ⑥).

Figure 6B:
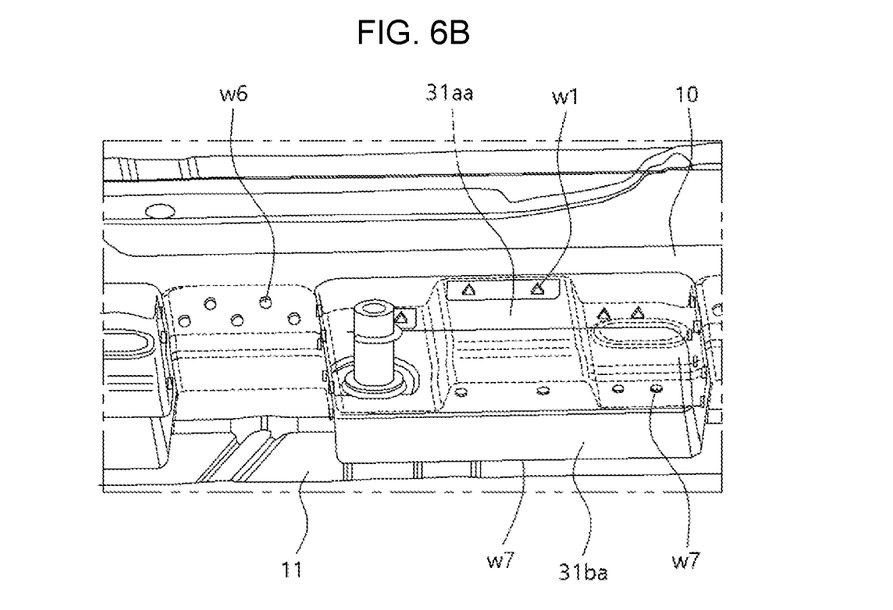

However, as the reinforcement unit 30 is applied, the surface (①) may be directly connected to the upper member 31a, the lower member 31b, and the connector 32 by spot welding, and the surface (④) may be directly connected to the bottom portion 31ba of the lower member 31b by spot welding as shown in FIG. 6B. The present invention has the same the number of matched surfaces as that of the conventional steel press welding structure, but restricts the surface (①) that exerts the largest resistance against the side collision, improving the side collision performance.

Furthermore, it is possible to achieve the lightweight structure and the improved stiffness using the steel which is a relatively inexpensive material.

Furthermore, since the present invention requires less material than in the conventional steel press welding structure, it is possible to reduce the weight and the cost of the side sill assembly.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A side sill assembly of a vehicle with reinforcement stiffness, the side sill assembly comprising:
    a side sill inner, a side sill outer, and a reinforcement unit provided between the side sill inner and the side sill outer,
    wherein the reinforcement unit includes:
        a plurality of cell members having an upper member and a lower member bonded to each other vertically at intervals therebetween, and disposed in a longitudinal direction of the vehicle at intervals from each other therebetween; and
        a connector bonded to rear and front end portions of different cell members among the plurality of cell members to connect the plurality of cell members to each other in the longitudinal direction of the vehicle.

2. The side sill assembly of claim 1, wherein each of the cell members includes:
    an upper member having at least a stage in the longitudinal direction of the vehicle; and
    a lower member accommodating the upper member therein and bonded to front and rear end portions of the upper member.

3. The side sill assembly of claim 2, wherein the lower member has a cross section with an opened upper portion, and a circumference of the upper member is bonded to an inside surface of the lower member, with the upper member accommodated in the lower member.

4. The side sill assembly of claim 2,
wherein a lower surface of the upper member is provided to be spaced from a bottom portion of the lower member at a predetermined interval.

5. The side sill assembly of claim 4, wherein the upper member includes:
the lower surface; and
an upper surface located higher than the lower surface, and disposed in the longitudinal direction of the vehicle together with the lower surface.

6. The side sill assembly of claim 5,
wherein the front and rear end portions of the upper member are formed with a first front flange portion and a first rear flange portion extending in a height direction of the vehicle to contact with an inside surface of the lower member, respectively.

7. The side sill assembly of claim 5, wherein the lower member includes:
the bottom portion bonded to an inclined surface of an inside surface of the side sill inner;
a second front flange portion extending upwards from a front end portion of the bottom portion;
a second rear flange portion extending upwards from a rear end portion of the bottom portion, and
a second side flange portion bonded to a surface perpendicular to the inside surface of the side sill inner.

8. The side sill assembly of claim 7,
wherein the upper member includes a first side flange portion extending upwards from a width direction of the vehicle, and
wherein the width direction of the vehicle from the upper surface and the lower surface of the upper member is formed with the first side flange portion contacting with the second side flange portion of the lower member.

9. The side sill assembly of claim 5,
wherein the upper surface of the upper member is located at a same height as a height of an upper end portion of the lower member.

10. The side sill assembly of claim 1, wherein the connector includes:
an upper surface portion;
a third front flange portion extending downwardly from a front end portion of the upper surface portion and bonded to a rear end portion of the cell member located on front thereof; and
a third rear flange portion extending downwardly from a rear end portion of the upper surface portion and bonded to a front end portion of the cell member located on rear thereof.

11. The side sill assembly of claim 10,
wherein the connector further includes a third side flange portion extending downwardly from a width direction of the vehicle from the upper surface portion of the connector and bonded to an upright surface of the side sill inner.

12. The side sill assembly of claim 5,
wherein at least a welding hole is formed on the lower surface at either a front or a rear of the upper surface of the upper member.

13. The side sill assembly of claim 12,
wherein a lower end portion of a battery mounting nut configured to mount a battery is bonded to the bottom portion of the lower member, and
wherein a through hole through which the battery mounting nut is provided to penetrate is formed in the lower surface at either the front or the rear of the upper surface.

14. The side sill assembly of claim 13,
wherein the battery mounting nut is bonded to the lower surface of the upper member by $CO_2$ welding or projection welding.

15. The side sill assembly of claim 13,
wherein an outside circumference of the battery mounting nut is bonded to an inside circumference of the through hole by $CO_2$ welding.

16. The side sill assembly of claim 1,
wherein the different cell members and the connector are bonded to each other by spot welding.

17. The side sill assembly of claim 1,
wherein the different cell members and the connector are bonded to the side sill inner by spot welding.

* * * * *